United States Patent [19]

Martinez et al.

[11] Patent Number: 4,534,026
[45] Date of Patent: Aug. 6, 1985

[54] NORMALIZED ERROR COMPENSATOR FOR MODEMS USING RADIAL AMPLITUDE MODULATION FOR MULTIPLEXING

[75] Inventors: Kenneth Martinez, Pinellas Park; William Betts, Maderia Beach, both of Fla.

[73] Assignee: Paradyne Corporation, Largo, Fla.

[21] Appl. No.: 558,610

[22] Filed: Dec. 6, 1983

[51] Int. Cl.³ .................................................. H04J 3/06
[52] U.S. Cl. ........................................ 370/100; 375/39
[58] Field of Search ............... 371/47; 375/39, 42, 375/118; 370/100

[56] References Cited

U.S. PATENT DOCUMENTS

| | | | |
|---|---|---|---|
| 4,213,006 | 7/1980 | Gerges | 375/118 |
| 4,347,616 | 8/1982 | Murakami | 375/39 |
| 4,381,546 | 4/1983 | Armstrong | 375/39 |
| 4,389,722 | 6/1983 | Hofmeister | 375/39 |
| 4,394,626 | 7/1983 | Kurihara et al. | 375/118 |
| 4,434,498 | 2/1984 | Mathieu | 375/118 |
| 4,458,356 | 7/1984 | Toy | 375/39 |
| 4,464,769 | 8/1984 | Forsberg et al. | 375/118 |

Primary Examiner—Benedict V. Safourek
Assistant Examiner—Kenneth I. Rokoff
Attorney, Agent, or Firm—Kane, Dalsimer, Kane Sullivan & Kurucz

[57] ABSTRACT

In a receiver for multiplexed QAM/PSK signals which have been radial amplitude modulated for synchronization, an error signal is generated by each received signal to the corresponding ideal point as mapped in the complex plane. A synchronizing signal is generated and synchronized by the error signal and is used for both demultiplexing, and amplitude demodulating the signal.

3 Claims, 7 Drawing Figures

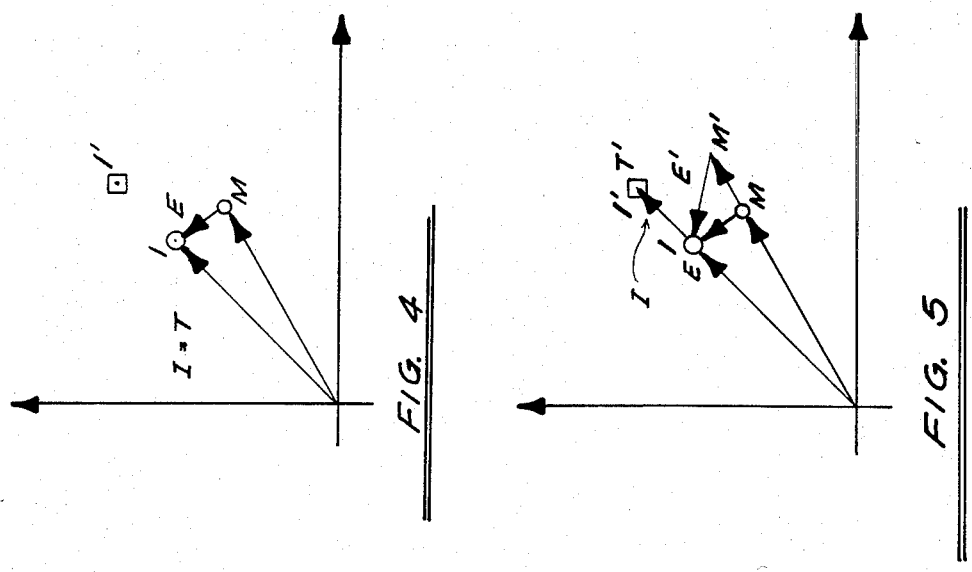
FIG. 4
FIG. 5
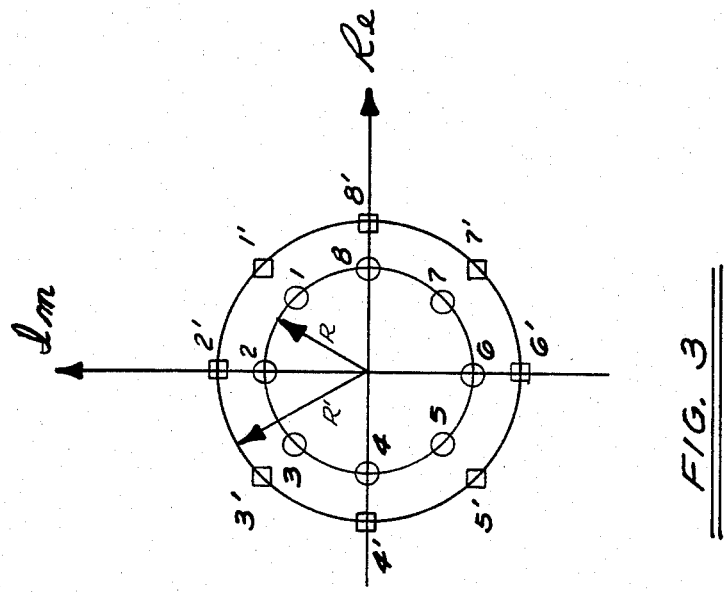
FIG. 3 ial amplitu
NORMALIZED ERROR COMPENSATOR FOR MODEMS USING RADIAL AMPLITUDE MODULATION FOR MULTIPLEXING

BACKGROUND OF THE INVENTION

1. Field of Invention

The present invention relates to an error compensator for a receiver of multiplexed PSK-type of QAM-type signals which have further been amplitude modulated to provide a synchronization signal for demultiplexing.

2. Description of the Prior Art

Long distance communication channels used for the exchange of digital data are expensive. In order to make efficient use of these channels the rate of communication has been increased to a level that is much higher than the generation rate of any single source of digital data. Therefore the data from several relatively low-speed data sources are frequently combined into a single data stream at the transmitter. The data is then sent as a stream over a communication channel at a relatively high speed. At the receiving end the data stream is separated into its original components for distribution. In order to insure that this separation is done properly a synchronizing signal must be sent along with the data stream by the transmitter to the receiver.

In the co-pending commonly assigned U.S. Pat. Ser. No. 447,988, filed Dec. 8, 1982, incorporated herein by reference, a device was described and claimed in which the data stream was sent in form of PSK or QAM signals. For synchronization, alternate signals are radially amplitude modulated and the change in amplitude is used to derive a channel separation signal. In order to limit the power required to transmit this type of signal and to insure that its signal-to-noise ratio is not unduly degraded the amplitude modulation is done at a very low level compared to the peak amplitudes of the signals. Therefore in order to detect the alternate signals having modulated amplitudes, a plurality of signals are averaged over a period of time to derive said channel separation signal.

It has been found in general that it is important to get rapid, preferably on-line information on the quality and performance of a communication channel being used by measuring the signal-to-noise ratio of the received signals. In the co-pending commonly assigned patent application Ser. No. 509,716 filed June 30, 1983, incorporated herein by reference, a device is disclosed and claimed for measuring on-line the performance of a communication channel by comparing the received PSK or QAM signals with the corresponding nominal or ideal signals as represented by signal constellations mapped in a complex plane. The resulting error signal is used to calculate the impairment of the channel. However when this method of measuring channel performance was applied to the system with radial amplitude modulation for synchronization, it was found that the error signals were distorted and amplified by the radial amplitude modulation. Furthermore it was found that if the receiver equalizer is not adjusted dynamically to take into account radial amplitude modulation, the performance of the receiver is slightly degraded.

OBJECTIVES AND SUMMARY OF THE INVENTION

Therefore an objective of the present invention is to provide a receiver which automatically compensates for radial amplitude modulation, thus permitting the accurate measurement of channel impairment.

A further objective is to provide a receiver in which demultiplexing synchronization is accomplished faster and more accurately than in previous receivers.

Other objectives and advantages of the invention shall be described in the following description of the invention.

According to this invention, a QMA of PSK receiver comprises a radial amplitude demodulator for demodulating received signals in accordance with a local synchronizing signal, means for generating an error signal corresponding to each demodulated signal, a local synchronizing signal generator and means for adjusting the output of said generator in accordance with said error signal.

BRIEF DESCRIPTION OF THE DRAWINGS

FIG. 3 represents a typical radial amplitude modulated 8-point PSK signal constellation mapped in the complex plane;

FIG. 4 illustrates the relationship between a typical received signal vector M, a corresponding error vector E and a nominal signal vector T;

FIG. 5 illustrates the effect of radial amplitude modulation on vector M, T and E of FIG. 4;

DESCRIPTION OF THE PREFERRED EMBODIMENT

Figure 1:
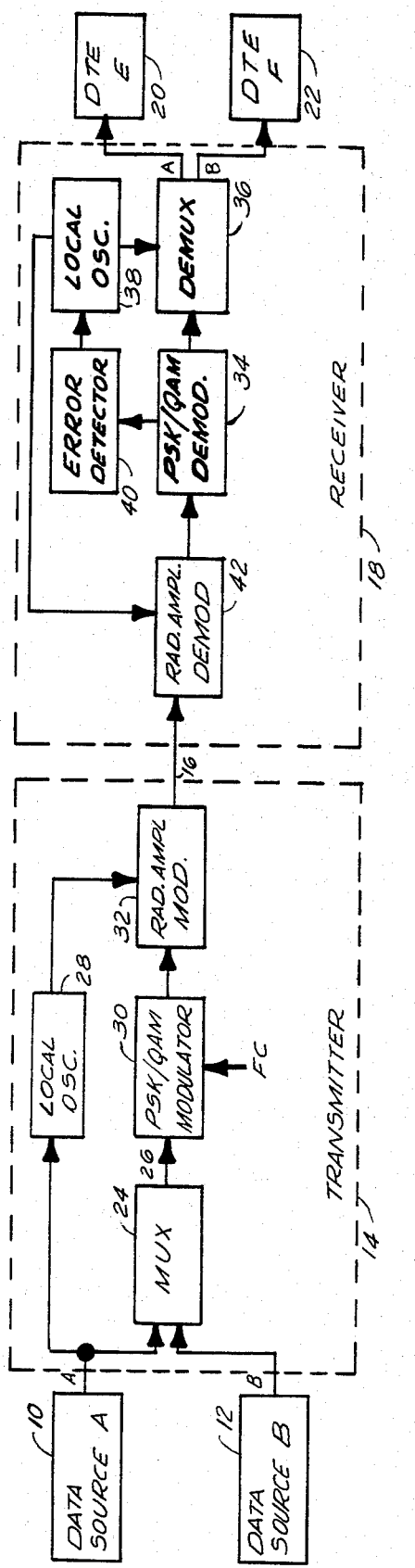
FIG. 1 shows a multiplexing scheme used to send two 2400 bits/sec on a single 1600 baud, 4800 bit channel.

The multiplexing scheme utilized by the present invention is shown in FIG. 1. The data streams A and B from sources 10 and 12, respectively are fed into transmitter 14. The transmitter sends corresponding signals described in more detail below over communication channel 16 to receiver 18. The receiver provides two distinct data streams to data terminal equipment E and F identified respectively by numbers 20 and 22 which are identical to the data streams A and B respectively.

Figure 2:
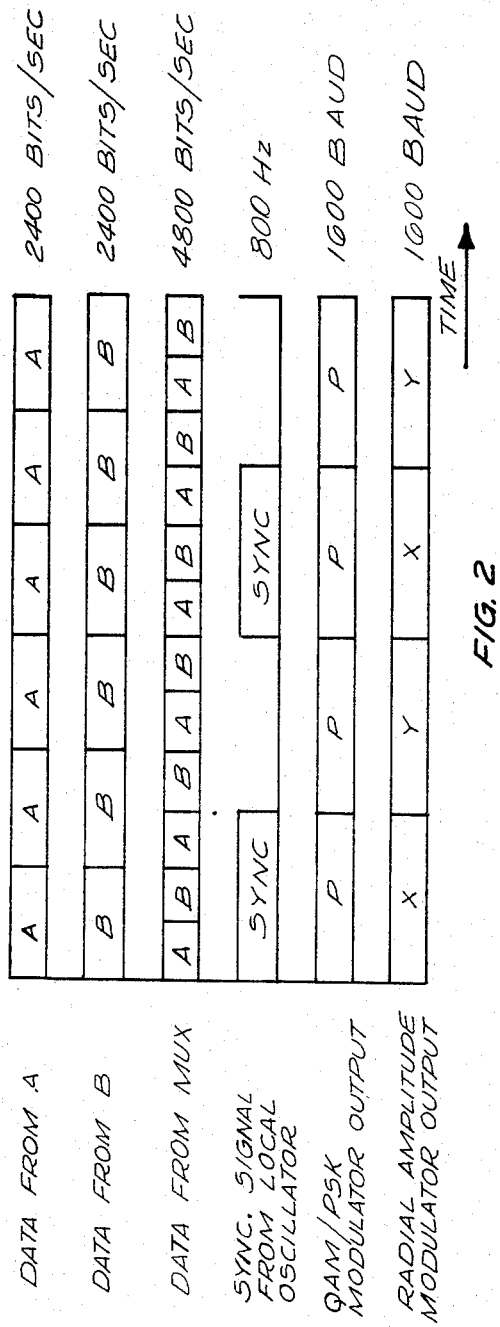
FIG. 2 shows the signal time frames within the transmitter.

Within transmitter 14 the data streams A and B are fed into a multiplexer 24 which combines them into a single data stream on line 26. The two data streams A and B, and the stream generated by the multiplexer are shown in FIG. 2. The two incoming data streams A and B may have a rate of 2400 bits/sec in which case the signals on line 26 have a rate of 4800 bits/sec. The transmitter also comprises a local oscillator 28 which generates an 800 Hz pulse signal. The oscillator is synchronized with one of the incoming data stream, for example data stream A, so that an 800 Hz pulse is started for every third incoming data signal A.

The output line 26 of multiplexer 24 is fed to a modulator 30 which combines the signals of said multiplexed output three at a time and modulates a carrier signal FC using a PSK or QAM modulation thus generating the PSK or QAM signals P. Signals P are then fed into radial amplitude modulator 32 which also receives the 800 Hz sync pulses from local oscillator 28. This modulator modulates alternate signals P in accordance with the sync pulses to generate a stream of PSK of QAM signals of the form XYXY as shown in FIG. 2 wherein all the X signals have been amplitude modulated by one scale factor and all the Y signals by another. The output of the radial amplitude modulator 32 is sent to receiver 18 via communication channel 16.

For example if the signals P can be mapped on a complex plane as 8 equidistant points arranged on a circle with its center coinciding with the center of the plane, then the output of amplitude modulator 32 can be mapped as shown in FIG. 3. On this figure the X signals can take on any one of the values of points 1–8, lying on a circle with radius R, while the Y signals can take the values of any one of points 1'–8' lying on a circle of radius R'. The scaling factor for R could be selected to be one and the scaling factor for R' could be slightly greater than one. As explained earlier if the ratio of R/R' is large, signal degradation occurs and the transmitted power increases.

Receiver 18 comprises a PSK or QAM demodulator 34 which converts the received signals into a single bit stream which is then sent a demultiplexer 36. The output of a local oscillator 38 is used by the demultiplexer to identify the groups of bits of the form ABA corresponding to signals X. In the above mentioned patent application Ser. No. 447,988, in order to synchronize the local oscillator of the receiver with the local oscillator 28 of the transmitter a running average is calculated for the amplitude of alternate received signals. If this running average is close to R then the two local oscillators are synchronized. If the average is close to R' then the oscillator 38 is out of phase and an appropriate adjustment is made.

In the present invention an error determination circuit 40 and a radial amplitude demodulator 42 is used in the receiver. The radial amplitude demodulator 42 scales down the amplitudes of the received signals by either a first factor or a second factor in accordance with the synchronizing signal generated by oscillator 38. If local oscillator 38 is synchronized with the transmitter oscillator 28, then the output of the demodulator 42 is identical to the output of PSK/QAM modulator 30 except for an error signal induced during transmission. However if the two oscillators are out of phase the error signal is very large. The error signal is detected by error signal detector 40. If the error signal exceeds a preset threshold an out-of-sync signal is sent to local oscillator 38 to change its phase by 180°.

Figure 6:
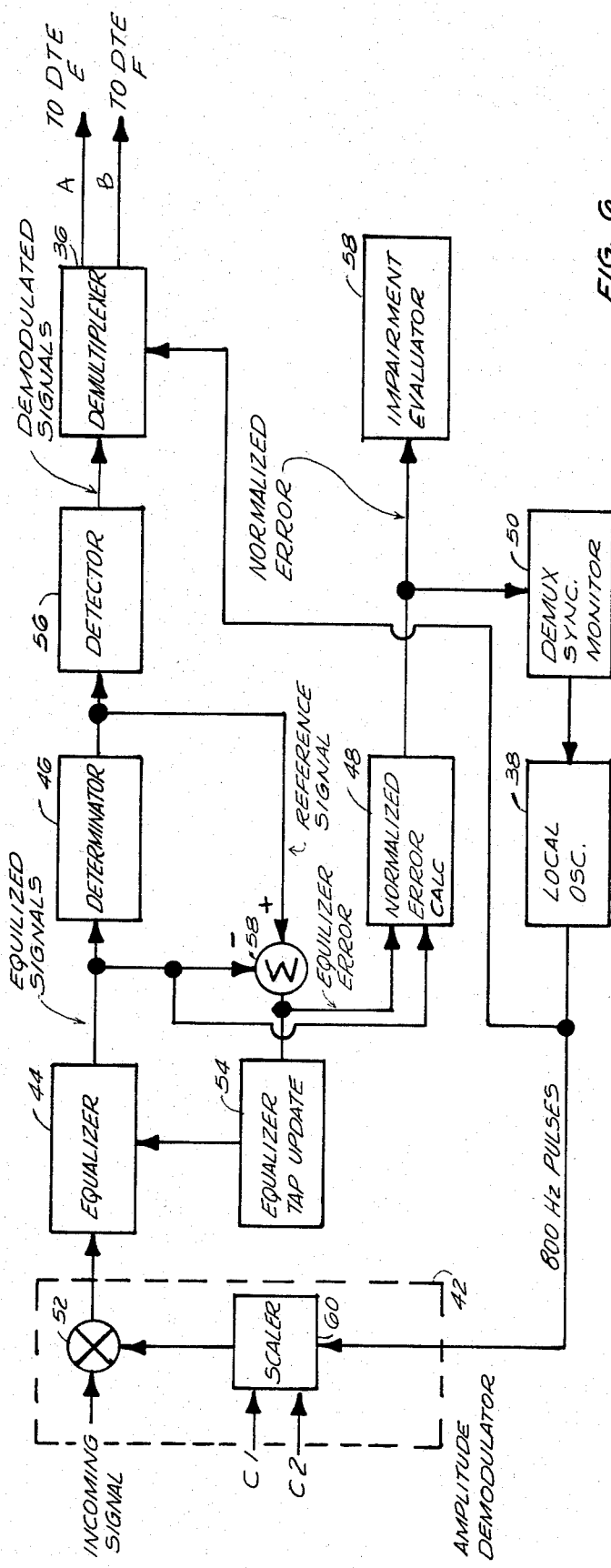
FIG. 6 shows the elements and the interconnections of the present invention.

The elements of receiver 18 are shown in FIG. 6. It comprises an equalizer 44, a determinator 46 and an error calculator 48 and a demultiplex sync monitor 50. The incoming signal, after passing through multiplier 52 is fed into equalizer 44. The multiplier 52 is part of the radial amplitude demodulator and its function is described below. The equalizer 44 has resettable taps which are controlled by the equalizer tap update circuit 54. The signals equalized by equalizer 44 are fed into a determinator 46 which in response outputs reference signals. The function of the determinator is best described with reference to FIG. 4.

In the following descriptions it should be understood all QAM of PSK signals are identified as vectors in the complex plane. Furthermore it is assumed that initially signal X at a given time is represented by point 1 in complex plane or vector T. It is further assumed that the radial amplitude modulator 32 used a unity multiplier on X. Due to various error signals, the actual equalized signal that is provided to the determinator 46 is M. The net error signal which is the resultant of the different error signals is E. The determinator 46 is designed to recognize any vector which extends into a predefined space around point 1 as being a received signal corresponding to transmitted signal T and generates a reference signal I, which in this case has identical components to T.

Reference signal I is transmitted to detector 56 which decodes or demodulates it into a demodulated signal of three bits identical to the ABA bits which were modulated into signal X by the transmitter.

The reference signal I is also fed into a complex summer 58. In this summer the real and imaginary components of signal M are subtracted from the components of signal I to obtain the error signal E. This signal is fed to the equalizer tap update circuit 54 to update the equalizer taps.

The error signal E is normalized by normalizing circuit 48. This is accomplished by cross multiplying the real component of signal M with the imaginary component of signal E and subtracting from this first product a second product formed by multiplying the imaginary component of signal M with the real component of signal E. This normalized error signal is fed into a channel impairment evaluator 58. The manipulations performed to obtain the normalized error signal are described in more detail in the copending commonly assigned Patent applications No. 509,716, filed June 30, 1983 and 407,451, filed Aug. 12, 1982.

The effects of radial amplitude modulation are illustrated in FIG. 5. If instead of signal X, signal Y is transmitted, corresponding to vector T', without radial amplitude demodulation, the output of the equalizer is M'. However the determinator still recognized only signal I which in this case is not equal to transmitted signal T' and therefore the apparent error signal E' is much larger than the true error signal E. When an impairment calculation is performed based on signal E' by circuit 58, the results are incorrect.

In order to eliminate the problem caused by radial amplitude modulation, the normalized error signal is fed into a demultiplex sync monitor circuit 50. When the normalized error signal exceeds a preset limit the monitor circuit 50 sends an "out of sync" signal to local oscillator 38 which in response converts its output, i.e. performs a 180° phase shift. The sync pulses of the oscillator 38 are fed into scaler 60 which then provides either multiplicant C1 or C2 to multiplier 52 depending on whether the sync pulse is higher or low. Thus multiplier 52 and scaler 60 comprise the radial amplitude demodulator 42. Constants C1 and C2 are chosen to reverse the effects of raidal amplitude modulator 32 thereby changing the equalized signal corresponding to signal Y from M' to M (see FIG. 5).

The sync pulses are also fed into demultiplexer 36 which uses it to separate the demodulated signal bits received from detector 56 into two bit stream A and B. These bit streams are then sent to data terminal equipment E and F.

Figure 7:
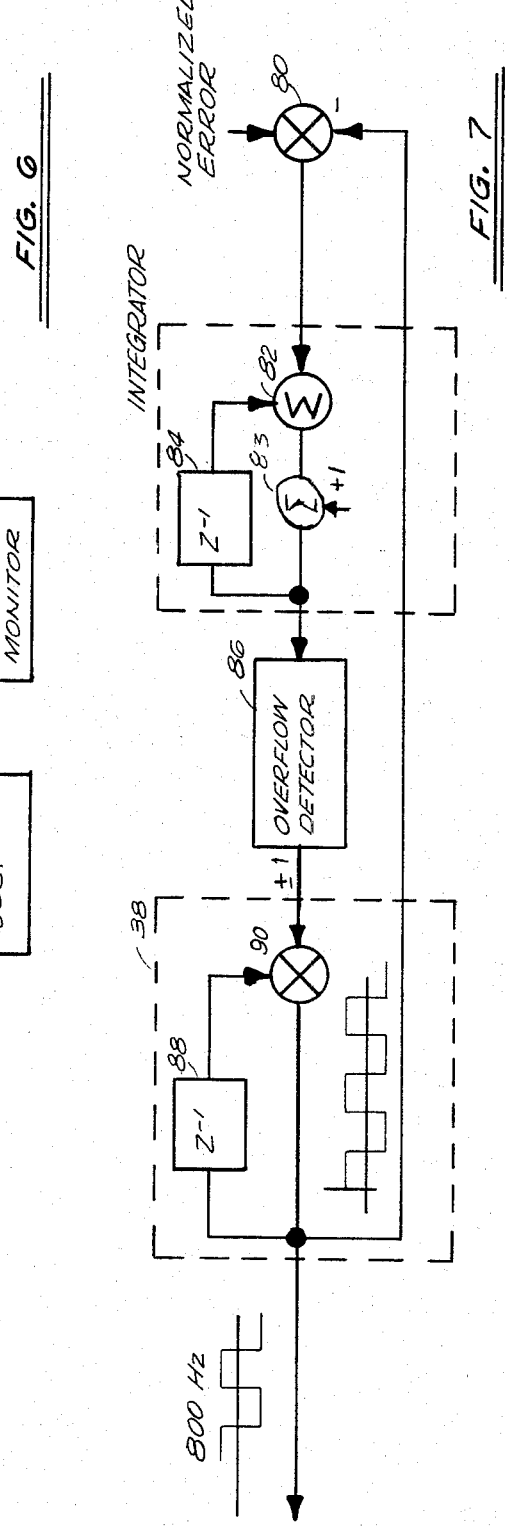
FIG. 7 shows the elements of the demultiplexing synchronization monitor circuit.

The demultiplex sync monitor may be implemented as shown in FIG. 7. The normalized error signal is fed into a first multiplier 80 which multiplies the normalized error signal and the negative value of the 800 Hz clock pulse of oscillator 38. The output of the multiplier is fed into an integrator consisting of summers 82 and 83 and a delay circuit 84. The purpose of summer 83 is to add a positive bias to the integrator input. The output of the integrator, is fed into a negative overflow detector 86 with an output which is "1" if its input, i.e. the output of the integrator, has not overflown from a negative to a positive level and "−1" if said input has overflown from a negative to a positive level. The output of the detector 86 is used to control the phase of the local oscillator 38 which comprises a delay line 88 and a multiplier 90. The oscillator is adjusted to generate positive and negative pulses at 800 Hz as shown. When the overflow detector feeds a "−1" into multiplier 90 it inverts the oscillator output. In addition to the radial amplitude demodulator and demultiplexer, the 800 Hz pulses are also fed back into multiplier 80. Thus the integrator generates an output which will increase to the positive maximum or decrease to a negative maximum and subsequently overflow depending on the amplitude of the normalized error.

FIGS. 6 and 7 and the description of these figures illustrate one means of implementing the subject invention. Numerous other means and modification can be made by one skilled in the art without departing from the scope of the invention as defined in the appended claims.

We claim:

1. A receiver for receiving a series of multiplexed data signals having radial amplitudes selected between a first and second value, every second signal having the same amplitude for demultiplex synchronization comprising:

means for demodulating said multiplexed data signals to produce demodulated signals including means for determining an ideal point for each received signal as mapped in a complex plane;

means for generating an error signal corresponding to said received data signals including means for determining the algebraic difference between said ideal point and the corresponding received signal;

means for generating a synchronizing signal in accordance with said error signal; and means for demultiplexing said demodulated signals in accordance with said synchronizing signal.

2. The receiver of claim 1 further comprising means of amplitude demodulating said alternate signals in accordance with said synchronizing signal.

3. The receiver of claim 1 wherein said synchronizing signal generating means comprises monitoring means for monitoring said error signal and inverting the synchronizing signal when said error signal exceeds a predetermined limit.

* * * * *